US009983876B2

(12) United States Patent
Atasu et al.

(10) Patent No.: US 9,983,876 B2
(45) Date of Patent: May 29, 2018

(54) NON-DETERMINISTIC FINITE STATE MACHINE MODULE FOR USE IN A REGULAR EXPRESSION MATCHING SYSTEM

(71) Applicant: International Business Machines Corporation, Armonk, NY (US)

(72) Inventors: Kubilay Atasu, Horgen (CH); Christoph Hagleitner, Wallisellen (CH); Raphael Polig, Dietikon (CH); Frederick R Reiss, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 871 days.

(21) Appl. No.: 14/184,751

(22) Filed: Feb. 20, 2014

(65) Prior Publication Data
US 2014/0244554 A1    Aug. 28, 2014

(51) Int. Cl.
*G06N 99/00*    (2010.01)
*G06F 9/38*    (2018.01)
*G06F 9/44*    (2018.01)

(52) U.S. Cl.
CPC ............... *G06F 9/38* (2013.01); *G06F 9/444* (2013.01)

(58) Field of Classification Search
None
See application file for complete search history.

(56) References Cited

U.S. PATENT DOCUMENTS 5,495,409 A * 2/1996 Kanno .............. G05B 19/042
700/79
5,568,811 A * 10/1996 Olstad ................... A61B 8/483
128/916
5,572,206 A * 11/1996 Miller .............. G06F 9/30178
341/51

(Continued)

FOREIGN PATENT DOCUMENTS

GB          2511072 A  *  8/2014

OTHER PUBLICATIONS

Goldberg, "Finite State Automata from Regular Expression Trees," The Computer Journal, vol. 36, No. 7, 1993, pp. 623-630.

(Continued)

*Primary Examiner* — Kakali Chaki
*Assistant Examiner* — Fuming Wu
(74) *Attorney, Agent, or Firm* — Rabin Bhattacharya

(57) ABSTRACT

A non-deterministic finite state machine module for use in a regular expression matching system. The system includes a computational unit implementing a non-deterministic finite state machine representing a regular expression, wherein the computational unit is configured to: receive an input data stream, wherein an occurrence of the regular expression is determined, and an activation signal; process the input data stream with respect to the non-deterministic finite state machine depending on the activation signal; and provide at least one branch data output for initializing an additional non-deterministic finite state machine module if the processing of an element of the input data stream according to the non-deterministic finite state machine results in a branching of a processing thread.

15 Claims, 9 Drawing Sheets

(56) References Cited

U.S. PATENT DOCUMENTS

| | | | | |
|---|---|---|---|---|
| 5,606,690 A * | 2/1997 | Hunter | G06F 17/273 | 382/229 |
| 5,831,883 A * | 11/1998 | Suter | G06F 17/142 | 708/404 |
| 5,930,256 A * | 7/1999 | Greene | H04L 12/5601 | 370/380 |
| 6,018,735 A * | 1/2000 | Hunter | G06F 17/30985 | |
| 6,102,969 A * | 8/2000 | Christianson | G06F 17/30864 | 707/999.002 |
| 6,609,189 B1 * | 8/2003 | Kuszmaul | G06F 7/506 | 708/421 |
| 6,654,715 B1 * | 11/2003 | Iwashita | G06F 17/504 | 703/14 |
| 7,039,166 B1 * | 5/2006 | Peterson | H04M 3/493 | 379/265.03 |
| 7,093,231 B2 * | 8/2006 | Nuss | G06F 8/31 | 707/999.006 |
| 7,188,168 B1 * | 3/2007 | Liao | H04L 43/18 | 709/224 |
| 7,305,391 B2 * | 12/2007 | Wyschogrod | G06F 17/30985 | |
| 7,512,634 B2 * | 3/2009 | McMillen | H04L 63/145 | |
| 7,779,049 B1 * | 8/2010 | Phillips | G06F 17/3064 | 707/809 |
| 7,818,806 B1 * | 10/2010 | Gyugyi | G06F 21/564 | 713/187 |
| 7,877,401 B1 * | 1/2011 | Hostetter | G06F 7/02 | 707/758 |
| 7,934,255 B1 * | 4/2011 | Gyugyi | G06F 21/564 | 713/187 |
| 8,024,802 B1 * | 9/2011 | Preston | H04L 63/1416 | 726/22 |
| 8,051,085 B1 | 11/2011 | Srinivasan et al. | | |
| 8,055,767 B1 * | 11/2011 | Forristal | H04L 63/1416 | 370/230 |
| 8,190,738 B2 | 5/2012 | Ruehle | | |
| 8,347,384 B1 * | 1/2013 | Preston | H04L 67/1097 | 726/23 |
| 8,527,488 B1 * | 9/2013 | Starovoitov | G06F 17/30985 | 707/706 |
| 8,656,478 B1 * | 2/2014 | Forristal | H04L 63/20 | 726/11 |
| 8,788,991 B2 * | 7/2014 | Xu | G06F 17/505 | 716/104 |
| 9,465,632 B2 * | 10/2016 | Ebcioglu | G06F 9/45533 | |
| 2004/0049596 A1 * | 3/2004 | Schuehler | H04L 43/18 | 709/238 |
| 2004/0059443 A1 * | 3/2004 | Sharangpani | G05B 19/0426 | 700/48 |
| 2004/0117037 A1 * | 6/2004 | Hinshaw | G06F 17/30477 | 700/2 |
| 2006/0085533 A1 * | 4/2006 | Hussain | G06F 17/30985 | 709/223 |
| 2006/0136570 A1 * | 6/2006 | Pandya | G06F 17/30985 | 709/217 |
| 2006/0143517 A1 * | 6/2006 | Douceur | G06F 11/1484 | 714/21 |
| 2006/0259818 A1 * | 11/2006 | Howell | G06F 9/45558 | 714/21 |
| 2007/0282833 A1 * | 12/2007 | McMillen | H04L 63/145 | |
| 2008/0034427 A1 | 2/2008 | Cadambi et al. | | |
| 2008/0141279 A1 * | 6/2008 | Mattson | G06F 8/453 | 719/313 |
| 2009/0080885 A1 * | 3/2009 | Mehrotra | H04J 14/0227 | 398/48 |
| 2009/0307660 A1 * | 12/2009 | Srinivasan | G06F 8/314 | 717/114 |
| 2010/0125593 A1 * | 5/2010 | Suthar | G06F 17/30985 | 707/758 |
| 2010/0269150 A1 * | 10/2010 | Potkonjak | G06F 21/10 | 726/2 |
| 2010/0287374 A1 * | 11/2010 | Roy | G06F 21/70 | 713/171 |
| 2010/0333108 A1 * | 12/2010 | Cypher | G06F 8/452 | 718/106 |
| 2011/0093496 A1 | 4/2011 | Bando et al. | | |
| 2012/0192164 A1 * | 7/2012 | Xu | G06F 8/447 | 717/149 |
| 2012/0290736 A1 * | 11/2012 | McMillen | H04L 63/145 | 709/231 |
| 2013/0055223 A1 * | 2/2013 | Xu | G06F 8/427 | 717/143 |
| 2014/0115566 A1 * | 4/2014 | Cao | G06F 9/444 | 717/129 |
| 2014/0244554 A1 * | 8/2014 | Atasu | G06F 9/38 | 706/12 |
| 2014/0280358 A1 * | 9/2014 | Coalson | G06F 17/30958 | 707/798 |
| 2015/0127925 A1 * | 5/2015 | Follett | G06F 15/82 | 712/30 |

OTHER PUBLICATIONS

Sidhu, R., "Fast Regular Expression Matching Using FPAS," FCCM '01 Proceedings of the 9th Annual IEEE Symposium on Field-Programmable Custom Computing Machines, pp. 227-238.

Majumder, A., "Scalable Regular Expression Matching on Data Streams," SIGMOD 08 Proceedings of the 2008 ACM SIGMOD International Conference on Management of Data, pp. 161-172.

Yu, F. et al., "Fast and Memory-Efficient Regular Expression Matching for Deep Packet Inspection," ANCS 2006, pp. 93-102, ACM 2006.

Van Lunteren, "High-Performance Pattern-Matching for Intrusion Detection," Proceedings INFOCOM 2006, pp. 1-13, 2006.

* cited by examiner

NON-DETERMINISTIC FINITE STATE MACHINE MODULE FOR USE IN A REGULAR EXPRESSION MATCHING SYSTEM

CROSS-REFERENCE TO RELATED APPLICATION

This application claims priority under 35 U.S.C. § 119 from GB Patent Application No. 1303130.7 filed Feb. 22, 2013, the entire content of which are incorporated herein by reference.

BACKGROUND OF THE INVENTION

1. Field of the Invention

The present invention relates to non-deterministic finite state machines. More particularly, the present invention is related to hardware implementations for non-deterministic finite state machines for simulating processes, such as regular expression matching.

2. Description of the Related Art

Regular expression matching is used in network intrusion detection systems and in information extraction systems. Regular expression matching is computationally challenging and requires high computing power.

A typical way of regular expression matching is to apply the input to a finite state machine representation of the regular expression. A regular expression can be converted into a non-deterministic finite state machine or a deterministic finite state machine using well-established techniques, as e.g. known from J. E. Hopcroft, R. Motwani and J. D. Ullmann, "INTRODUCTION TO AUTOMATA THEORY, LANGUAGES AND COMPUTATION", Addison-Wesley, 2000.

Furthermore, efficient hardware architectures for programmable deterministic finite state machines are available, as e.g. known from J. van Lunteren, "HIGH-PERFORMANCE PATTERN-MATCHING FOR INTRUSION DETECTION", Proceedings INFOCOM 2006, pages 1 to 13, 2006, or F. Yu, Z. Chen, Y. Diao, T. V. Lakshman and R. H. Katz, "FAST AND MEMORY-EFFICIENT REGULAR EXPRESSION MATCHING FOR DEEP PACKET INSPECTION", ANCS 2006, pages 93 to 102, ACM 2006.

Hardware architectures based on reconfigurable non-deterministic finite state machines are also available, as e.g. known from R. Sidhu, V. K. Prasanna, "FAST REGULAR EXPRESSION MATCHING USING FPGAS", Proceedings FCCM 2001, pages 227 to 238.

However, the above exemplary approaches are severely limited as they usually cannot support start offset reporting and capturing groups. However, start offset reporting, and capturing groups are essential in information extraction systems relying on this information. Existing hardware architectures simply set a flag in case of a regular expression match which only reveals the end offset of a match in the input stream. The start offsets then need to be calculated based on the end offsets if the regular expression has a fixed length. However, regular expressions often include one or more placeholders for none, one or a plurality of characters, so that the overall length of the regular expression is not known.

A naïve approach for start offset reporting is recording the start offset each time the first character or a prefix of a regular expression is matched in the offset stream. However, this is problematic if the first character or the prefix appears multiple times in the regular expression, creating overlaps, where multiple start offset values must be stored at any time by the regular expression matcher and the stored start offset values must be associated with different end offsets eventually.

U.S. Pat. No. 8,190,738 B2 discloses a system and a method for hardware processing of regular expressions. State information associated with one or more states of a state machine is stored in respective memory locations of the memory, wherein the state machine is configured to detect patterns in an input data stream. State information, such as transitions and spin counts updated as characters of an input data stream, is processed. A crossbar is used to interconnect the states stored in the register bank. However, such a crossbar can be very expensive to implement because the number of states in a nondeterministic state machine grows linearly with the number of characters in the associated regular expression.

U.S. Pat. No. 8,051,085 B1 discloses a method and an apparatus for determining the length of one or more substrings of an input string that matches a regular expression. The input string is searched for the regular expression using a non-deterministic finite state machine and, upon detecting a match state, a selected portion of the input string is marked as a match string. The non-deterministic finite state machine is inverted, so that it embodies the inverse of the regular expression. The match string is also reversed and searched for the inverted regular expression using the inverted non-deterministic finite state machine. A counter is incremented for each character processed during the reverse search operation. The current value of the counter each time the match state in the inverted non-deterministic finite state machine is reached indicates the character length of a corresponding substring that matches the regular expression. A disadvantage of such an approach is that the input string has to be scanned twice for each regular expression match, which can significantly reduce the processing rate.

United States Patent Application Publication Number US 2011/0093496 A1 discloses a method for determining whether an input string matches at least one regular expression. Each of the at least one regular expressions is checked for a match between the input string accepted and the given regular expression using the configured nodes of the state machine corresponding to the given regular expression. This includes checking detection events from a simple string detector, submitting queries to identified modules of a variable string detector, and receiving detection events from the identified modules of the variable string detector.

Document A. Majumder, R. Rastogi, S. Vanama, "SCALABLE REGULAR EXPRESSION MATCHING ON DATA STREAMS", SIGMOD '08, Proceedings of the 2008 ACM SIGMOD International Conference on Management of Data, Pages 161-172, discloses a regular expression matching system. The system combines the processing efficiency of deterministic finite state machines with the space efficiency of non-deterministic finite state machines to scale to hundreds of regular expressions. This is achieved by caching only the frequent core of each deterministic finite state machine in memory, as opposed to the entire deterministic finite state machine. The regular expressions are clustered such that regular expressions whose interactions cause an exponential increase in the number of states are assigned to separate groups.

In document H. Nakahara et al., "A REGULAR EXPRESSION MATCHING USING NON-DETERMINISTIC FINITE AUTOMATON", International Conference on Formal Methods and Models for Codesign (MEMOCODE), 2010, 8th IEEE/ACM, 26-28 Jul. 2010, Page(s): 73-76, discloses an implementation of CANSCID (Combined Architecture for Stream Categorization and Intrusion Detection). To satisfy the required system throughput, the packet assembler and the regular expression matching are implemented by hardware while the counting of matching results and the system control are implemented by a microprocessor. A regular expression matching circuit is performed by converting the given regular expressions into a non-deterministic finite state machine and by reducing the number of states. Finally, a finite-input memory machine to detect p-characters is generated, and the matching elements realizing the states are generated.

SUMMARY OF THE INVENTION

According to a first aspect of the present invention, a non-deterministic finite state machine module for use in a regular expression matching system is provided. The system includes: a computational unit implementing a non-deterministic finite state machine representing a regular expression, wherein the computational unit is configured to: receive an input data stream, wherein the occurrence of the regular expression is determined, and an activation signal; process the input data stream with respect to the non-deterministic finite state machine depending on the activation signal; and provide branch data outputs for initializing an additional non-deterministic finite state machine module if the processing of an element of the input data stream according to the non-deterministic finite state machine results in a branching of the processing thread.

According to a second aspect of the present invention, a routing network for use with a plurality of non-deterministic finite state machine modules in a regular expression matching system is provided. The system includes: a plurality of input ports, each associated with one of the plurality of non-deterministic finite state machine modules; a plurality of output ports, each associated with one of the plurality of non-deterministic finite state machine modules; wherein the plurality of input ports are configured to receive a branch data output from the associated one of the plurality of non-deterministic finite state machine modules, respectively; wherein the plurality of output ports are configured to activate the associated one of the plurality of non-deterministic finite state machine modules and forward branch data thereto depending on a branch flag information, wherein the routing network is configured to select, for each received branch data output indicating that an inactive non-deterministic finite state machine module is activated, one of the plurality of non-deterministic finite state machine modules which is inactive; and to forward the respective branch data output to the respective output port associated with the selected one of the plurality of non-deterministic finite state machine modules.

According to a third aspect of the present invention, a regular expression matching system is provided. The system includes: a plurality of the non-deterministic machines modules; the routing network; wherein each of the plurality of non-deterministic finite state machine modules is connected to one of the plurality of input ports and one of the plurality of output ports of the routing network.

According to a fourth aspect of the present invention, regular expression matching system is provided. The system includes: at least one of the non-deterministic finite state machine modules; at least one deterministic finite state machine module having a computational unit implementing a deterministic finite state machine representing a regular expression, wherein the computational unit is configured to: receive the input data stream and an activation signal; process the input data stream with respect to the implemented deterministic finite state machine depending on the activation signal; and the routing network; wherein each of the at least one non-deterministic and deterministic finite state machine modules is connected to one of the plurality of input ports and one of the plurality of output ports of the routing network.

According to a fifth aspect of the present invention, a regular expression matching method which is performed in a regular expression matching system having a plurality of non-deterministic finite state machines, each representing the regular expression and an interconnection network is provided. The method includes: receiving an input data stream in which an occurrence of the regular expression is determined; processing the input data stream with respect to at least one activated non-deterministic finite state machines in a respective processing thread; providing branch data for initializing an additional processing thread of a non-deterministic finite state machine if the processing of an element of the input data stream according to the at least one activated non-deterministic finite state machines results in a branching of the processing thread; indicating for each received branch data output that a new processing thread of a non-deterministic finite state machine is initialized, selecting one of the plurality of non-deterministic finite state machines that is inactive; and forwarding the respective branch data output to the selected non-deterministic finite state machine.

According to a sixth aspect of the present invention, a regular expression matching method performed in a regular expression matching system having one non-deterministic finite state machine and a plurality of deterministic finite state machines is, each at least partly representing the regular expression, and an routing network, wherein only the first state of the non-deterministic finite state machine is a non-deterministic state while the other states of the non-deterministic finite state machine are deterministic is provided. The method includes: receiving an input data stream in which an occurrence of the regular expression is determined; processing the input data stream with respect to the one non-deterministic finite state machine; providing branch data by the non-deterministic finite state machine for initializing an additional processing thread in one of the plurality of deterministic finite state machines; indicating for each received branch data output that a new processing thread of a deterministic finite state machine shall be initialized, selecting one of the plurality of deterministic finite state machines that is inactive; and forwarding the respective branch data output to the selected deterministic finite state machine.

BRIEF DESCRIPTION OF THE DRAWINGS

Embodiments of the present invention are described in more detail in conjunction with the accompanying drawings.

DETAILED DESCRIPTION OF THE PREFERRED EMBODIMENTS

Figure 1:
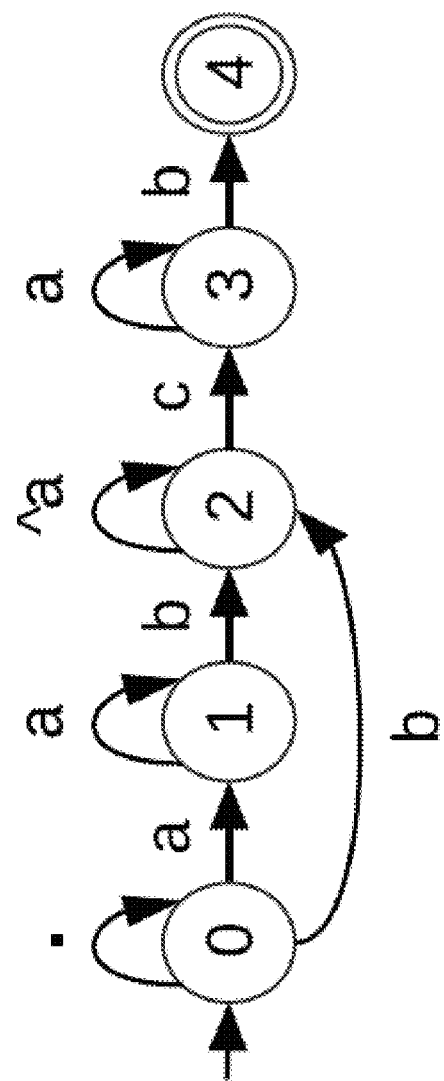
FIG. 1 shows an example of a state transition diagram of a non-deterministic finite state machine, according to an embodiment of the present invention.

FIG. 1 shows a state transition diagram for a non-deterministic finite state machine for an exemplary regular expression a*b[^ a]*ca*b ('*' indicating any number of repetitions and '^' a negation). The above regular expression is of undetermined length and is defined by any number of repetitions of "a" (none, one or multiple), one "b", any number of repetitions of "not a" (characters different from "a"), one "c" and any number of repetitions of "a", one "b" in that order. The non-deterministic state transition diagram comprises five states beginning with an initial state '0', where each incoming character is input and ends at an accepting state '4' which is reached when the regular expression is matched. The state transitions between the different states '0' to '4' occur each time a specific condition is fulfilled.

The given state transition diagram is non-deterministic for states '0' and '2', as the occurrence of an "a" or "b" as a next character in state '0' and the occurrence of a "c" in state '2' can require a branching in the non-deterministic finite state machine, thereby forming two parallel threads each time such a situation occurs. For state '0', the occurrence of an "a" can lead to transitions to state '0' and state '1', the occurrence of a "b" in state '0' can lead to transitions to state '0' and state '2', and for state '2' the occurrence of a "c" can lead to transitions to state '2' and state '3'.

One important task in regular expression matching is reporting the start offsets for each regular expression match. However, for instance, with an input string "abcabcab" the regular expression matching should report four matches in this string with the first match starting at string offset 0 (first occurrence of "a") and ending at string offset 4 (second occurrence of "a"), a second match starting at string offset 1 (first occurrence of "b") and ending at string offset 4 (second occurrence of "a"), a third match starting at string offset 3 (first occurrence of "c") and ending at string offset 7 (third occurrence of "a") and a fourth match starting at string offset 4 (second occurrence of "a") and ending at string offset 7 (third occurrence of "a").

This example illustrates that multiple start offset values must be kept at any time by a regular expression matching system and equal offset values must eventually be associated with different end offsets. The existing approaches that are based on programmable deterministic finite state machines and hardwired non-deterministic finite state machines are not capable of supporting such functionality. Common information extraction systems typically report only leftmost matches.

Furthermore, there is a need to determine and store start and end offsets for capturing groups. Capturing groups correspond to sub-expressions (subsets of the regular expressions to be found within a regular expression). Results of found capturing groups are to be reported by their group start offsets and groups end offsets in addition to the start offset of a matched regular expression.

Figure 2:
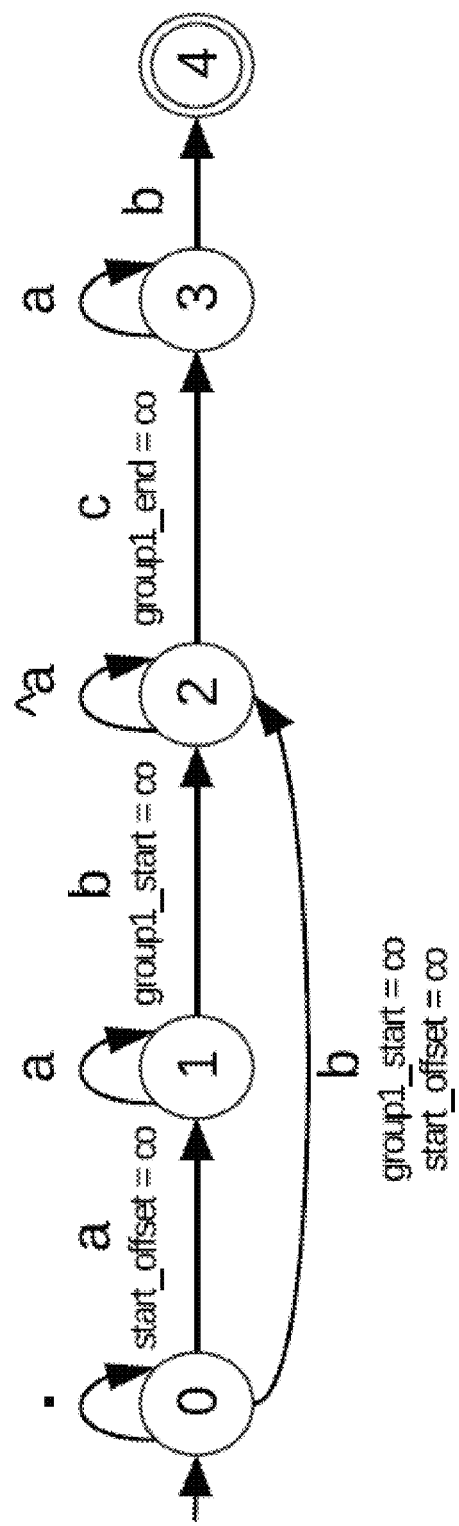
FIG. 2 shows an example of a state transition diagram and illustrates the use of a capturing group, according to an embodiment of the present invention.

FIG. 2 illustrates the use of a capturing group, where the sub expression b[^ a]*c is captured using parentheses. When one or more capturing groups are defined in a regular expression, whenever a regular expression match occurs, the start and end offsets of each capturing group must also be reported in addition to the start offset of the complete regular expression. FIG. 2 illustrates a way of implementing this behavior assuming that the state machine receives an input character and the offset information co of the current input character in the input stream cur_input. In FIG. 2, the transitions from state '0' to states '1' and '2' copy the offset information co, into a start offset register. The transitions from states '0' and '1' to state '2' copy the offset in formation co into a capturing group start offset register, and the transition from state '2' to state '3' copy the offset information co into a capturing group end offset register.

Figure 3:
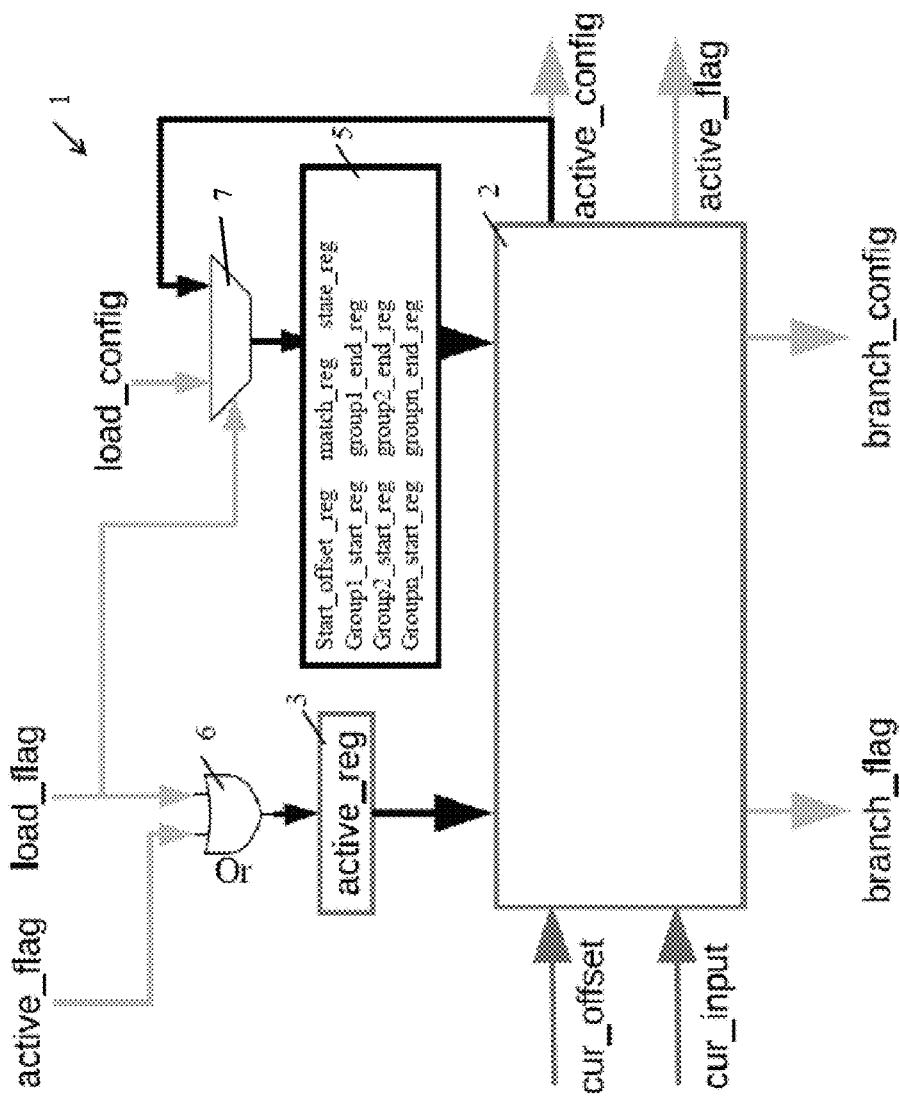
FIG. 3 shows an architecture of a non-deterministic finite state machine implemented in a non-deterministic finite state machine module to be applied in a regular expression matching system, according to an embodiment of the present invention.

FIG. 3 shows a block diagram of a non-deterministic finite state machine module (NFM) 1, according to an embodiment of the present invention. NFM 1 of FIG. 3 is one of one or more replicas which can be used in the regular expression matching system introduced herein. NFM 1 includes a computational unit 2 which is operated synchronously. In computational unit 2, a state transition diagram corresponding to the example given in FIG. 1 is implemented in a hardwired manner or using memory-based programmable state machine. NFM 1 receives an input stream cur_input e.g containing characters or symbols as elements in conjunction with an indication of their respective offsets cur_offset corresponding to e.g. a count from the first element of the input stream cur_input. Computational unit 2 has an active flag output for providing an active flag information active_flag indicating whether or not a computed state transition does exist.

Computational unit 2 can only operate in a single thread. At each non-deterministic state, in case a respective condition is fulfilled that requires a branching of the thread, branch outputs are activated to allow the activation of a further NFM 1 of the regular expression matching system and to handover essential information.

Computational unit 2 is coupled to a mode register 3 and a configuration register 5. Mode register 3 stores information about whether NFM 1 is active (active_reg=1) or inactive (active_reg=0). Inactive NFMs 1 are always in state 0 and no state transitions can occur in those state machines.

Moreover, the current state of each active NFM 1 is stored in configuration register 5. Configuration register 5 contains a number of subregisters such as a start offset register to store a start offset start_offset_reg of an analyzed string, a match register to store an indication of a match of the regular expression match_reg, a state register to store a current state state_reg of NFM 1 and a number of group start registers and group end registers to store the start and end offsets group1_start_reg, group1_end_reg, group2_start_reg, group2_end_reg, groupn_start_reg, groupn_end_reg.

The current state state_reg is indicated in the form of an appropriate representation. For the above given example, the current state state_reg can simply be indicated by its number 0, 1 . . . 4. The start offset start_offset_reg is initially set each time the first character of the regular expression appears in the input stream cur_input. Computational unit 2 raises the match output match_flag whenever an accepting state (state 4) is reached as a result of the state transitions signaling a regular expression match.

A next active configuration output active_config indicates the next settings of configuration register 5 including a next state information computed using the current state as stored in the state subregister. Each time an incoming character (element) is processed it is determined with which next state NFM 1 will proceed in a following cycle. This next state information is stored in the state subregister for retrieval in the next cycle.

At its input, mode register 3 receives the output of an OR gate 6. A first input of OR gate 6 is set by an active flag output (active_flag=1) of the associated computational unit 2, indicating whether a valid state transition has been found at the current state (as stored in state register 5) and for the current input character in the current cycle. For instance, at state '1' of FIG. 1 there are no state transitions defined for input character "c". In such a case, the active flag output active_flag of NFM 1 can be set to 0 (active_flag=0), which will inactivate the current NFM 1 in the next cycle as the active_flag=0 sets the output of mode register 3 to '0' via OR gate 6. If it is determined in the following cycle that the mode register is set to '0', no further processing in the respective NFM 1 is allowed.

To store the configuration values of configuration register 5 they are looped through computational unit 2 via configuration output active_config, so that the output of configuration register 5 is updated in computational unit 2 and fed back to the input of configuration register 5 via a demultiplexer 7.

The branch data outputs of computational unit 2 include a branch flag output providing a branch flag information branch_flag, and a branch configuration output providing a branch configuration information branch_config, which are necessary to activate a further inactive NFM which can be substantially identical to NFM 1. Reduced NFMs without the branch data output capabilities can be used in cases described below. The branch_flag is set from 0 to 1 in case a non-deterministic state transition has occurred which requires a new NFM 1 to be activated, i.e. a thread splitting is performed, in which active NFM 1 further processes its thread and one branch operation and an NFM 1 to be activated further processes another branch operation.

The branch configuration output provides branch configuration information branch_config corresponding to values for the subregisters of a configuration register of a further NFM 1 to be activated. The branch configuration output contains a start offset start_offset_reg of the regular expression, an initial value for the match subregister indicating that no match has occurred yet (for the purpose of resetting the match_reg value, a next state state_reg NFM 1 to be activated has to start computation and a number of group start and end offset values group1_start_reg, group1_end_reg, group2_start_reg, group2_end_reg, groupn_start_reg, groupn_end_reg.

The branch configuration output indicates the start offset of the respective regular expression to be analyzed and substantially corresponds to the settings of the offset subregister in configuration register 5 of active NFM 1 at the cycle in which the non-deterministic state transition has occurred. Once a non-deterministic state transition has occurred, the branch outputs are forwarded to OR gate 6 and demultiplexer 7 of an inactive NFM 1, respectively, as a load flag input for receiving a load_flag information load_flag and a load config input for receiving a load config information load_config.

Hence, the load flag output which serves for providing the load flag information load_flag of active NFM 1 is supplied to a second input of OR gate 6, such that if the branch_flag is set, it is applied to the second input of OR gate 6 of a selected inactive NFM 1, so that mode register 3 is set, thereby activating the selected NFM 1 which was inactive before.

Simultaneously, the branch configuration output branch_config are applied to demultiplexer 7 of the respective inactive NFM 1 as load configuration information load_config, so that the configuration information of inactive NFM 1 are set to the values given by the branch configuration information of active NFM 1 in which the non-deterministic state transition has occurred.

Demultiplexer 7 is switched by the value of the load flag information load_flag (branch_flag of active NFM 1), so that in case active NFM 1 outputs a branch flag information branch_flag of 1, mode register 3 of an inactive NFM 1 is set to 1, demultiplexer 7 is controlled, so that the branch configuration information branch_config of active NFM 1 are applied as load configuration information load_config to configuration register 5 of inactive NFM 1, thereby storing it. In this process, a previously inactive NFM 1 is being activated.

A state transition occurs in every clock cycle. If an input character is consumed the next configuration computation uses the current input (cur_input), the current offset (cur_offset) and the current state (state_reg) stored in configuration register 5 to produce an active configuration output, which involves a state, a match signal, a start offset, and zero or more capturing group start and end offsets as mentioned above. These values are stored in configuration register 5 in the next clock cycle.

An active state machine can become inactive if no valid state transitions are found at the current state for the current input character. For instance, at state 1 in the state machine of FIG. 1, there are no state transitions defined for the input character c. In such cases, the active flag output of the state machine is set to 0, which makes it inactive in the next clock cycle.

One idea of the above non-deterministic finite state machine module is the capability of using multiple replicas of the same non-deterministic finite state machine module in a regular expression matching system, wherein the multiple replicas of the same non-deterministic finite state machine module can operate in parallel and can communicate through an interconnection network. Furthermore, the above non-deterministic finite state machine module is configured to activate another inactive non-deterministic finite state machine in case of a non-deterministic state transition, so that the splitting/branching of a processing thread is performed. Hence, the non-deterministic finite state machine module allows for a scalable regular expression matching system, wherein expression matching can be computed in parallel. Moreover, start offset information, which can be contained in the branch data, can be provided for each regular expression match in a facilitated manner.

Moreover, the branch data outputs can include: a branch flag output for providing a branch flag information for activating another non-deterministic finite state machine module; a branch configuration output for providing a branch configuration information including at least one of a branch offset information for forwarding an indication about a start offset of the input data stream and/or one or more capturing group start and end offset outputs for forwarding an indication about the start and end offsets of one or more capturing groups in the input data stream; a match output information to indicate when a regular expression match occurred; and a branch state information to hand over an indication of a state to be processed next in the non-deterministic finite state machine module to be activated.

According to an embodiment, the computational unit can be configured to provide active data outputs for keeping the processing thread of the computational unit alive, wherein the active data outputs comprises: a active flag output for providing a active flag information for activating another non-deterministic finite state machine module; an active configuration output for providing an active configuration information including at least one of an active offset information for forwarding an indication about a start offset of the input data stream and one or more capturing group start and end offset outputs for forwarding an indication about the start and end offsets of one or more capturing groups in the input data stream; a match information to indicate when a regular expression match occurred; and a active state information to keep an indication of a state to be processed next in the computational unit.

Furthermore, it can be provided that at least one of the units is provided: a logic gate receiving the active flag information and a load flag information at its input, so that the computational unit is or remains activated if at least one of the active flag information and the load flag information is set; and a configuration register either for keeping an active configuration output stored for the thread performed in the computational unit or for storing an externally provided branch configuration output, depending on the load flag information.

Moreover, the branch data output can include start offset information indicating the element of the input data stream which initiated the respective processing thread.

Figure 4:
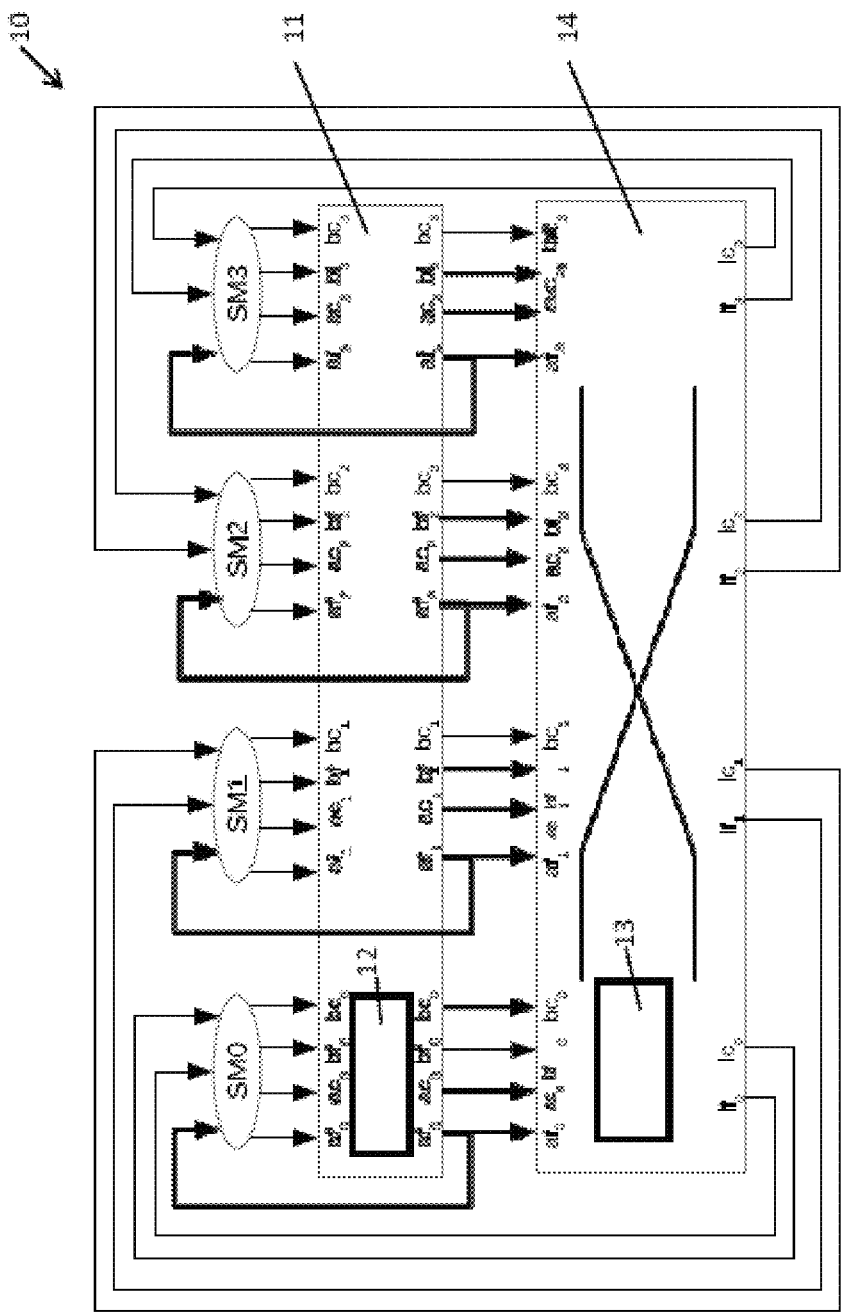
FIG. 4 shows a schematic block diagram indicating a regular expression matching system with four non-deterministic finite state machine modules, according to an embodiment of the present invention.

In FIG. 4, a regular expression matching system 10 is schematically depicted. The architecture provides multiple NFMs 1, four in the present embodiment, which are referenced as SM0, SM1, SM2, SM3. Regular expression matching system 10 is scalable and any number of NFMs 1 can be provided.

An interconnection interface 11 and a routing network 14 are further provided which allows NFMs 1 to communicate. Initially starting with a single NFM 1, multiple NFMs 1 can be activated during processing the input stream cur_input, as described before. NFMs 1 to be activated must be provided with some initialization data in the form of the branch outputs of an active NFM 1, as explained before. The initialization data include the branch flag branch_flag and the branch configuration information branch_config which are forwarded to NFM 1 to be activated as load_flag and load_config, respectively.

In routing network 14, inputs referenced as $af_n$ (active_flag) $ac_n$ (active_config), $bf_n$ (branch_flag), $bc_n$ (branch_config) are provided by interconnection interface 11 as well as outputs $lf_n$, $lc_n$ are provided, wherein n is an index number indicating which of NFMs 1, i.e. SM0, SM1, SM2 or SM3, the respective inputs and outputs are associated with. Each of the set (same n) of inputs $af_n$, $ac_n$, $bf_n$, $bc_n$ of interconnection interface 11 are coupled with the branch outputs branch_flag, branch_config of the associated NFM 1 and the active flag information active_flag of the active flag output is coupled to the respective $af_n$. Each of the set (same n) of outputs $lf_n$, $lc_n$ of the interconnection interface 11 is coupled to the load inputs load_flag and load_config of the associated NFM 1.

While the $af_n$ indicates which of NFMs 1 is active, routing network 14 routes the inputs $bf_n$, and be to the respective outputs $lf_n$, $lc_n$ of an inactive NFM 1.

While processing the input stream cur_input, some of activated NFMs 1 can become deactivated again, as described above. In theory, any combination of active and inactive NFMs 1 can exist in regular expression matching system 10 while processing the input stream cur_input. Whenever a branch_flag is set, there can be multiple inactive NFMs 1, one of which has to be selected and activated.

It is assumed that the only non-deterministic state in a given NFM 1 is the state '0'. In such a case, the only NFM 1 that is capable of asserting the branch_flag can be NFM 1 that implements the state 0. In this case, the branch_flag, and the branch_config outputs can be eliminated from the remaining NFMs 1 for resource optimization. Whenever the branch_flag information is asserted by the first NFM 1, if there are multiple available inactive NFMs 1, an arbitration logic (22) in routing network 14 must be used to select NFM 1 that will/can be activated. The load_flag information becomes asserted in the selected NFM 1 and the branch_config information are routed as load configuration information load_config to the corresponding subregisters of configuration register 5 of the selected NFM 1. A straightforward implementation can select NFM 1 with the lowest index among all the inactive NFMs 1, which can be efficiently implemented using an architecture that is similar to a priority decoder.

In general, there can be multiple non-deterministic states in an NFM 1 and multiple branch flag information for activating a new NFM 1 can be asserted in parallel by multiple NFMs 1. Parallel handling of all the branchings requires selecting multiple inactive NFMs 1 and parallel routing of multiple branch_config information to the selected NFMs 1. Implementing such a functionality without introducing multiple delay cycles into the state transition loop requires interconnection interface 11 to be efficient.

Interconnection interface 11 substantially serves to forward the respective $af_n$, $ac_n$, $bf_n$, $bc_n$ outputs to routing network 14 and can include an integrated shutdown logic 12 to reduce the amount of redundant computation and to support leftmost match semantics. If one or more NFMs 1 end up in the same state as indicated by their respective branch config signals, only the one with the smallest start o set can remain active, and the active flags of the remaining state machines can be set to 0. Such an operation can be implemented as a preprocessing step, before any routing starts, and the updated active_flag ($af_n$) information can be routed back to NFMs 1 that produced the original values of these signals.

Figure 5:
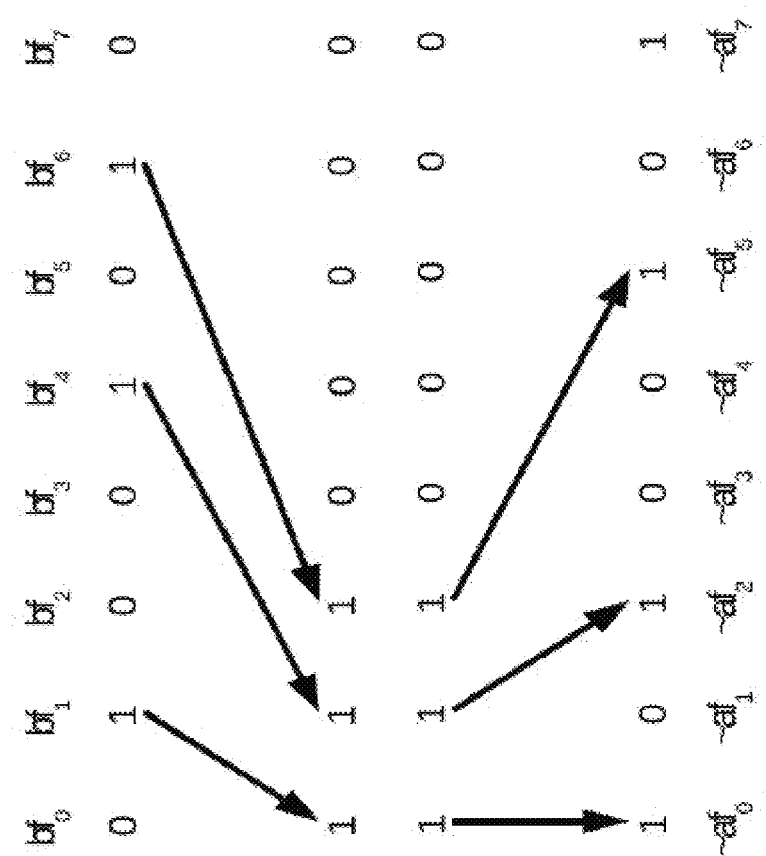
FIG. 5 shows a schematic illustration of a pack and unpack operation performed in the routing network, according to an embodiment of the present invention.

Next, the branch_flag ($bf_n$) and branch_config ($bc_n$) settings are packed using the branch_flag value, as illustrated in FIG. 5. The packing operation serves to collect association information about which of the non-deterministic finite state machine modules are activated. The parallel pack (or parallel extract) operation can be efficiently implemented using a reverse butterfly network, and an additional control logic 13 that uses parallel prefix computation as known from Y. Hilewitz et al., "Fast Bit Compression and Expansion with Parallel Extract and Parallel Deposit Instructions"; ASAP 2006, IEEE.

After the parallel pack operation, a parallel unpack operation is used to forward the branch_offset and branch_state information to the inactive NFMs 1 as load_offset and load_state signals. The unpack operation is performed using the negated active_flag information of NFMs 1 as also illustrated in FIG. 5, and serves for allocating non-deterministic finite state machine modules to be activated according to the association information. The parallel unpack operation can be efficiently implemented using a butterfly network, where the additional control logic 13 uses parallel prefix computation as described in Y. Hilewitz et al., "Fast Bit Compression and Expansion with Parallel Extract and Parallel Deposit Instructions"; ASAP 2006, IEEE. The critical path of the butterfly and reverse butterfly networks, and the parallel prefix computation grow only logarithmically with the number of replicas. This enables high-speed and highly-parallel hardware implementations for pack and unpack operations.

Figure 6:
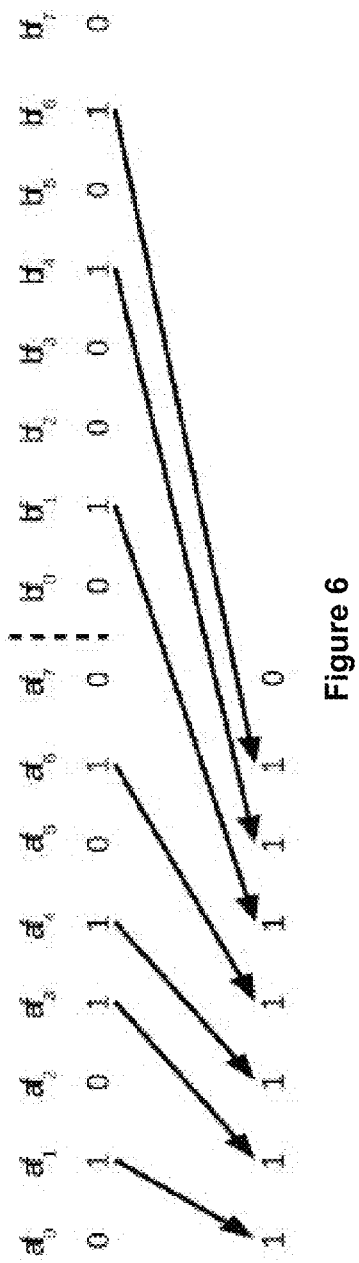
FIG. 6 shows a schematic illustration of a combined pack operation performed in the routing network, according to an embodiment of the present invention.

The routing scheme described above can be optimized. The delay of a butterfly or a reverse butterfly network is log(N), and the area overhead is N log(N), where N is the number of nodes (i.e., replicas) interconnected by the network. The overall delay of routing network 14 is therefore 2 log(N), and the overall area overhead is 2N log(N). FIG. 6 shows that the pack and unpack operations described in the previous section can be replaced by a wide pack operation (reverse butterfly processing) that combines all 2N values associated with active_flag (af) and branch_flag (bf) values.

The "wide pack operation" is a process which can rearrange the active and to be activated NFMs 1, e.g. using a reverse butterfly process. Assuming that the current set of active NFMs 1 are encoded into a bit vector "0101", which indicates that NFMs '0' and '2' are inactive, and NFMs '1' and '3' are active and that no branch flags are raised in the current cycle, the value of the bit vector can be computed as "1100" in the next cycle. This implies that the active data of NFM '1' is shifted into the active data of NFM '0', and the active data of NFM '3' is shifted into the active data of NFM '1'. In contrast to the wide pack operation, the "pack and unpack sequence" can maintain the bit vector "0101" in the next cycle.

When using the wide pack operation NFMs 1 do not be configured to receive the active flag information active_flag and the active config information active_config as inputs which makes OR gate 6 and demultiplexer 7 obsolete. Computational unit 2 then only receives the load_flag information load_flag and the load config information load_config from routing network 14 as inputs.

Substantially all set active_flag (af) and branch_flag (bf) values are ordered and associated to a smaller number of available NFM 1 in regular expression matching system 10. The delay of such a pack operation is $$\log(2N)=\log(N)+1, \text{ and}$$

the area overhead is $$2N \log(2N)=2N \log(N)+2N.$$

Figure 7:
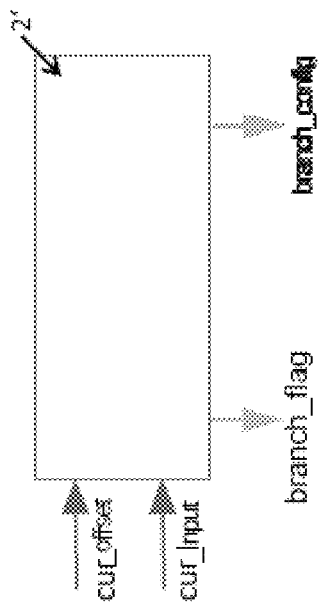
FIG. 7 shows an architecture of a simplified non-deterministic finite state machine module to be applied in a regular expression matching system, according to an embodiment of the present invention.

The state machine implementation for such an approach can be simplified by computational unit 2' as illustrated in FIG. 7, where the active_flag output active_flag of OR gate 6 and active configuration outputs active_config received at the inputs of demultiplexer 7 can be removed from the state machine making OR gate 6 and demultiplexer 7 obsolete.

The routing network can comprise a first network (e.g., a reverse butterfly network) which is configured to perform a pack operation and a second network (e.g., a butterfly network) which is configured to perform an unpack operation.

Furthermore, the routing network can be configured to perform only a wide pack operation, which replaces the sequence of pack and unpack operations, in particular using a reverse butterfly processing, to reduce the latency at the expense of silicon area.

The routing network can be configured to perform a routing operation, in particular using a reverse butterfly processing, wherein according to a given packing scheme one of the non-deterministic finite state machine modules is selected for each active and each to be activated non-deterministic finite state machine module wherein configuration information of each of the active and each of the to be activated non-deterministic finite state machine modules are copied into the associated non-deterministic finite state machine.

According to an embodiment the input ports can each comprise: a branch flag input for receiving a branch flag information indicating that a non-deterministic finite state machine module shall be activated; a branch configuration input for receiving a branch configuration output; and wherein the output ports each comprise: a load flag output for outputting a load flag information to the non-deterministic finite state machine module associated with the respective output port; a load configuration output for outputting a load configuration information.

According to another embodiment, if the regular expression is non-anchored, i.e. a position in the input stream cur_input where a match must occur is not defined, the first NFM 1 SM0 always remains at state '0' and active. On the other hand, if the regular expression is anchored, the first NFM 1 SM0 remains active for one cycle only, and performs a state transition that starts from state 0.

Therefore, it is sufficient to implement only the state transitions for state '0' in the first NFM 1 SM0, and it is possible to also omit mode and configuration registers 3, 5 shown in FIG. 2 for resource optimization. FIG. 7 depicts the first NFM 1 SM0 in such a system. The first NFM 1 SM0 does not provide any active flag or active configuration outputs as these values are internally stored and need not to be updated externally.

The remaining state machines are configured as shown in FIG. 2.

Figure 8:
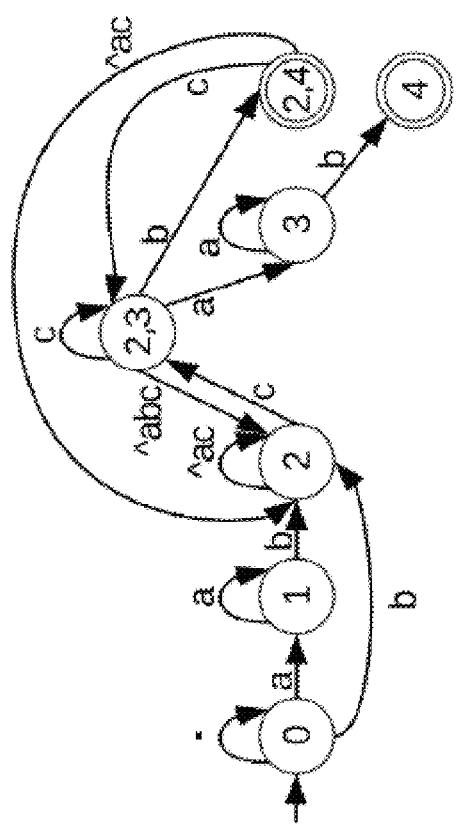
FIG. 8 shows an architecture of a non-deterministic finite state machine implemented in a non-deterministic finite state machine module to be applied in a regular expression matching system with only the first state being non-deterministic, according to an embodiment of the present invention.
Figure 9:
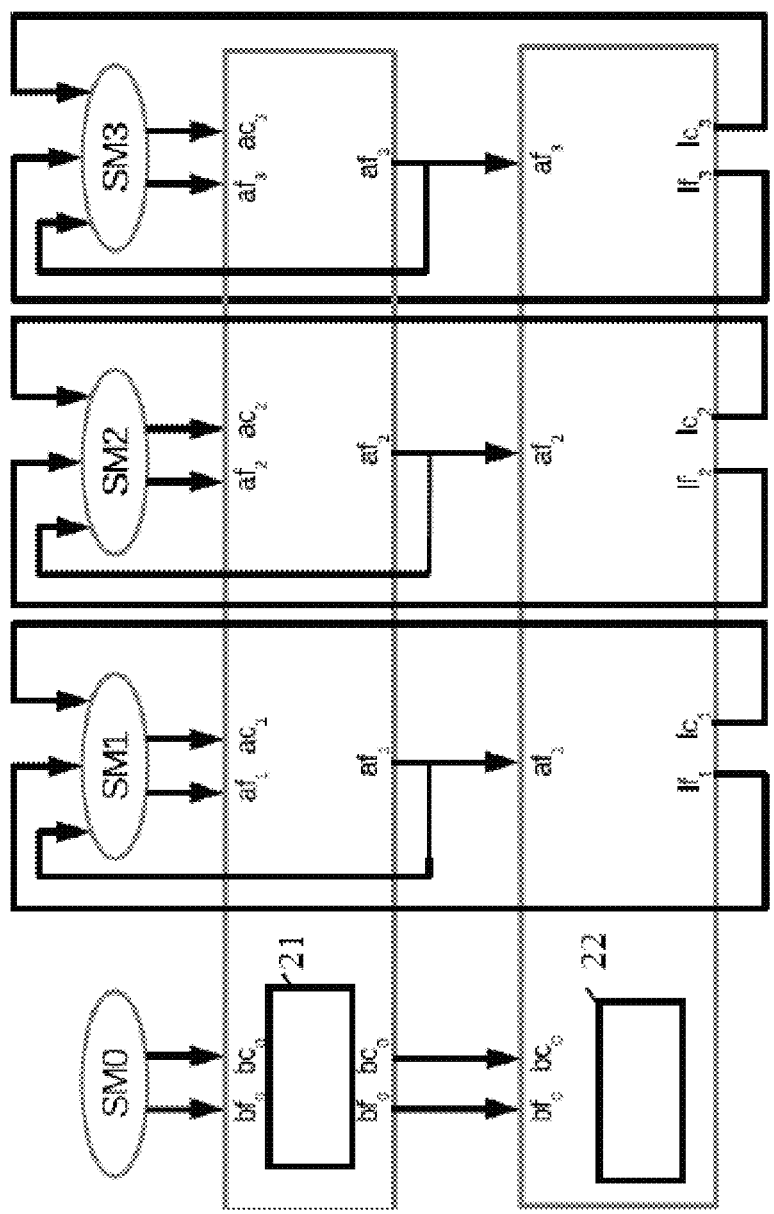
FIG. 9 shows a schematic block diagram indicating another regular expression matching system with one non-deterministic finite state machine modules and three deterministic finite state machine modules, according to an embodiment of the present invention.

According to another embodiment, in a regular expression matching system 20 shown in FIG. 9 the only non-deterministic state is state '0', as shown in the state machine of FIG. 8. FIG. 8 illustrates a transformed state machine which corresponds to the non-deterministic state machine of FIG. 1 wherein only the first state 0 is kept non-deterministic. In general, transforming a non-deterministic state machine to a deterministic state machine can be performed using a well-known power set algorithm. To keep the first state '0' of a non-deterministic state machine non-deterministic, the power set algorithm is applied only to the state machine which has been modified by removing a transition loop from state '0' before applying the power set algorithm. After the power set algorithm has been applied, which rendered the remaining non-deterministic states to deterministic states, the transition loop is added to state '0' again thereby turning state '0' non-deterministic again.

In such a case, the only NFM 1 that can assert the branch flag value branch_flag can be the first NFM 1 SM0 that implements the state 0. All other NFMs 1 then cannot implement state '0'. In this case, the branch flag output and the branch configuration output can be eliminated from the remaining NFMs 1 SM1-SM3 for resource optimization.

Whenever the branch_flag value is asserted by the first NFM 1 SM0, if there are multiple available NFMs 1, an appropriate arbitration logic 22 must be used to select NFM 1 that will be activated. In our architecture, the load flag information load_flag gets asserted in the selected NFM 1, and the branch configuration information branch_config are routed to the load configuration information load_config of selected NFMs 1. A straightforward implementation can select NFM 1 with the lowest index among all the inactive implemented using a simple arbiter, which effectively eliminates complex routing network 14 that utilizes pack/unpack operations.

A shutdown logic 21 is coupled with NFMs 1 can still be utilized as a preprocessing step prior to the priority arbitration performed by arbitration logic 22.

The maximum number of states of the non-deterministic finite state machine states that can become active concurrently can be computed statically by applying the power set algorithm and computing a mapping of the non-deterministic states to the deterministic finite state machine states. The maximum number of states of a non-deterministic finite state machine that can combine in a state of a deterministic finite state machine does not have to be equal to the maximum number of NFMs 1 that can be activated at any point in time by above architectures. The reason is that there can be multiple different state transition paths that lead to the same state, although starting from different offsets. However, while supporting the leftmost match semantics, only the match with the smallest start offset matters. Therefore, if more than one NFM 1 end up in the same state, only a single replica having the smallest start o set value is kept active, while all other NFMs 1 become inactive. In other words, the leftmost match semantics guarantee that the maximum number of NFMs 1 that become activate at any point in time cannot exceed the maximum number of states of a non-deterministic state machine that combine in a single state of a deterministic state machine.

Figure 10:
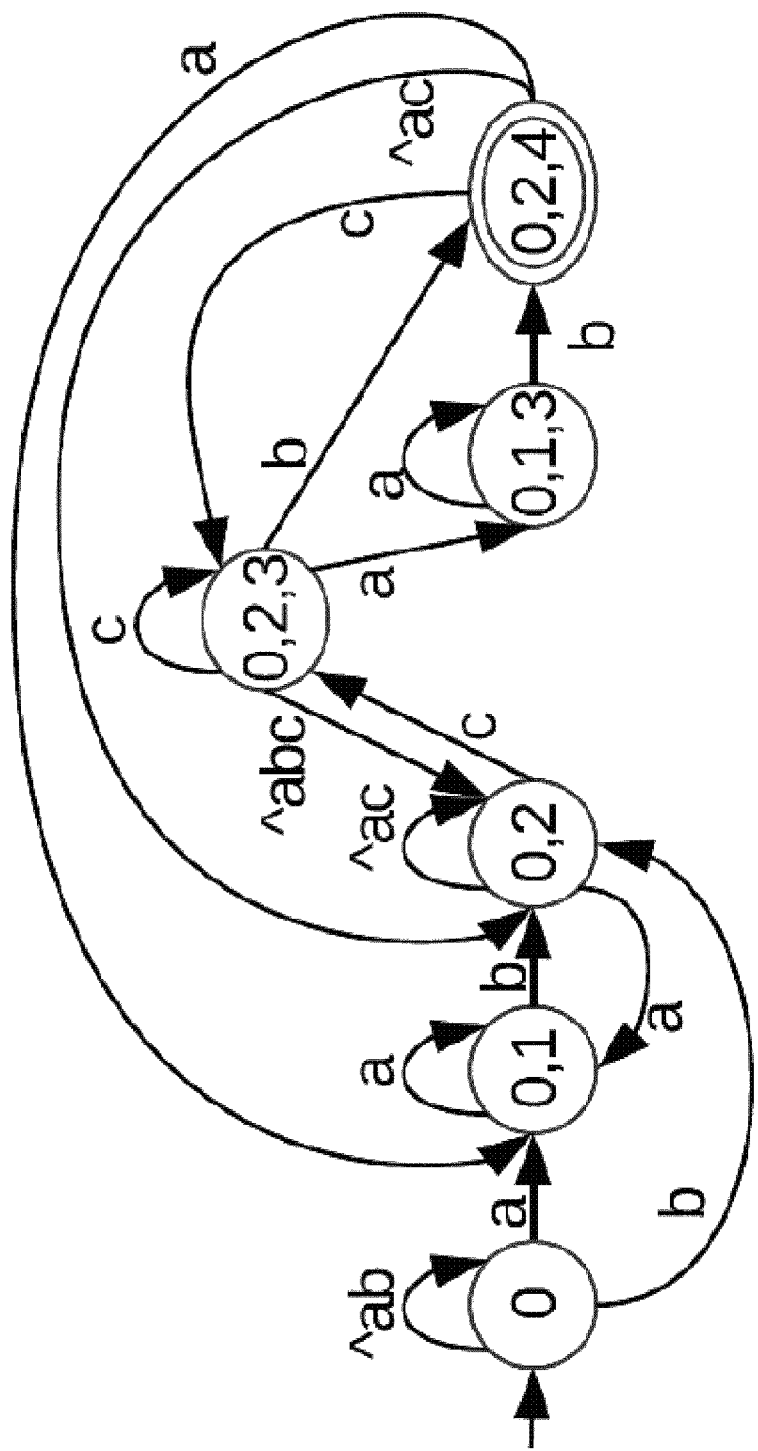
FIG. 10 shows an architecture of a deterministic finite state machine implemented to be applied in a regular expression matching system, according to an embodiment of the present invention.

The total number of state machines N needed is derived by converting a state machine with one or more nondeterministic states into a deterministic state machine using the power-set algorithm. An example of such a deterministic state machine is shown in FIG. 10. The value of N is computed by storing the mapping between the states of the nondeterministic state machine and the states of the deterministic state machine during the powerset algorithm, and finding the state with the maximum number of nondeterministic states mapped in the deterministic state machine. For instance, three non-deterministic states of FIG. 1 are mapped to states (0, 2, 3) and (0, 1, 3) of the non-deterministic state machine of FIG. 10. Therefore, N=3, in this case. Note that once N is computed, the size of interconnection interface 11 and routing network 14 should also be adapted, e.g., the pack/unpack operations or the arbitration logic supports only N inputs.

It can be provided that only the first state of the non-deterministic finite state machine is a non-deterministic state while the other states of the non-deterministic finite state machine are deterministic, wherein the non-deterministic finite state machine module is provided for a first non-deterministic state of the non-deterministic finite state machine and the deterministic finite state machines are configured to not provide a branch data output. In this case, the routing network can comprise only arbitration logic, and the more expensive pack and unpack operations can be avoided.

Furthermore, the regular expression matching system comprises a number N of non-deterministic finite state machine modules and/or deterministic finite state machine modules, wherein the number N is defined by: converting a non-deterministic state machine into a deterministic state machine using a power-set algorithm, storing the mapping between the states of the nondeterministic state machine and the states of the deterministic state machine when the powerset algorithm is applied, and determining the number N by finding the state with the maximum number of non-deterministic states mapped in the deterministic state machine.

What is claimed is:

1. A non-deterministic finite state machine module for use in a regular expression matching system, comprising:
    a computational unit implementing a non-deterministic finite state machine representing a regular expression, wherein the computational unit is configured to:
    receive an input data stream, wherein an occurrence of the regular expression is determined, and an activation signal;
    process the input data stream with respect to the non-deterministic finite state machine depending on the activation signal;
    indicate a start offset in the input stream of the regular expression match; and
    provide at least one branch data output for initializing an additional non-deterministic finite state machine module if the processing of an element of the input data stream according to the non-deterministic finite state machine results in a branching of a processing thread;
    wherein the non-deterministic finite state machine module allows for a scalable regular expression matching system to be computed in parallel;
    wherein the at least one branch data output includes a branch flag output to provide a branch flag information to activate the additional non-deterministic finite state machine module;
    wherein the at least one branch data output includes a branch configuration output to provide a branch configuration information including at least one branch offset information to forward an indication about a start offset of the input data stream or at least one capturing group start and end offset outputs to forward an indication about the start and end offsets of the at least one capturing group in the input data stream;
    wherein the at least one branch data output include a match output information to indicate when a regular expression match occurs; and
    wherein the at least one branch data output include a branch state information to provide an indication of a state to be processed next in the additional non-deterministic finite state machine module to be activated.

2. The non-deterministic finite state machine module according to claim 1, wherein the computational unit is configured to provide a plurality of active data outputs for maintaining the processing thread of the computational unit, wherein the plurality of active data outputs comprise:
    an active flag output to provide an active flag information to activate the additional non-deterministic finite state machine module;
    an active configuration output to provide an active configuration information including at least one active offset information to forward an indication about a start offset of the input data stream and at least one capturing group start and end offset outputs to forward an indication about the start and end offsets of the at least one capturing group in the input data stream;

a match information to indicate when a regular expression match occurs; and an active state information to retain an indication of a state to be processed next in the computational unit.

3. The non-deterministic finite state machine module according to claim 2, wherein at least one of the following units is provided:

a logic gate receiving the active flag information and a load flag information at its input, so that the computational unit is or remains activated if at least one of the active flag information and the load flag information is set; and a configuration register either to retain an active configuration output stored for the processing thread performed in the computational unit or to store an externally provided branch configuration output, depending on the load flag information.

4. A routing network for use with a plurality of non-deterministic finite state machine modules in a regular expression matching system, comprising:

a plurality of input ports, each associated with one of the plurality of non-deterministic finite state machine modules;

a plurality of output ports, each associated with one of the plurality non-deterministic finite state machine modules;

wherein the plurality of input ports are configured to receive a branch data output from the associated one of the plurality of non-deterministic finite state machine modules, respectively;

wherein the plurality of input ports each include a branch flag input to receive the branch flag information indicating that one of the plurality of non-deterministic finite state machine modules is activated;

wherein the plurality of input ports each include a branch configuration input to receive a branch configuration output;

wherein the plurality of output ports are configured to activate the associated one of the plurality of non-deterministic finite state machine modules and forward the branch data output thereto depending on a branch flag information;

wherein the non-deterministic finite state machine module allows for a scalable regular expression matching system to be computed in parallel;

wherein the branch configuration output provides a branch configuration information including at least one branch offset information to forward an indication about a start offset of the input data stream or at least one capturing group start and end offset outputs to forward an indication about the start and end offsets of the at least one capturing group in the input data stream; and wherein the routing network is configured to select, for each received branch data output indicating that an inactive non-deterministic finite state machine module is activated, one of the plurality of non-deterministic finite state machine modules which is inactive; and to forward the respective branch data output to the respective output port associated with the selected one of the plurality of non-deterministic finite state machine modules.

5. The routing network according to claim 4, comprising a first network which is configured to perform a pack operation and a second network which is configured to perform an unpack operation.

6. The routing network according to claim 5, wherein the first network is a reverse butterfly network or wherein the second network is a butterfly network.

7. The routing network according to claim 4, wherein the routing network is configured to perform a routing operation using a reverse butterfly processing, and wherein according to a given packing scheme one of the plurality of non-deterministic finite state machine modules is selected for each active and each to be activated one of the plurality of non-deterministic finite state machine modules wherein configuration information of each of the active and each of the to be activated ones of the plurality of non-deterministic finite state machine modules are copied into the associated one of the plurality of non-deterministic finite state machine.

8. The routing network according to claim 4, wherein the plurality of output ports each comprise:

a load flag output to output a load flag information to the one of the plurality of non-deterministic finite state machine modules associated with the respective output port; and a load configuration output to output a load configuration information.

9. A regular expression matching system, comprising:

a plurality of non-deterministic finite state machine modules for use in a regular expression matching system, comprising:

a computational unit implementing a non-deterministic finite state machine representing a regular expression, wherein the computational unit is configured to:

receive an input data stream, wherein an occurrence of the regular expression is determined, and an activation signal;

process the input data stream with respect to the non-deterministic finite state machine depending on the activation signal; and provide at least one branch data output for initializing an additional non-deterministic finite state machine module if the processing of an element of the input data stream according to the non-deterministic finite state machine results in a branching of a processing thread; and a routing network for use with the plurality of non-deterministic finite state machine modules in a regular expression matching system, comprising:

an arbitration logic;

a plurality of input ports, each associated with one of the plurality of non-deterministic finite state machine modules, wherein the plurality of input ports are configured to receive a branch data output from the associated one of the plurality of non-deterministic finite state machine modules, respectively;

a plurality of output ports, each associated with one of the plurality non-deterministic finite state machine modules, wherein the plurality of output ports are configured to activate the associated one of the plurality of non-deterministic finite state machine modules and forward the branch data output thereto depending on a branch flag information;

wherein the routing network is configured to select, for each received branch data output indicating that an inactive one of the plurality of non-deterministic finite state machine modules is activated, one of the plurality of non-deterministic finite state machine modules which is inactive; and to forward the respective branch data output to the respective output port associated with the selected one of the plurality of non-deterministic finite state machine modules;

wherein each of the plurality of non-deterministic finite state machine modules is connected to one of the plurality of input ports and one of the plurality of output ports of the routing network; and wherein the non-deterministic finite state machine module allows for a scalable regular expression matching system to be computed in parallel; and wherein the branch data output includes a branch configuration output to provide a branch configuration information including at least one branch offset information to forward an indication about a start offset of the input data stream or at least one capturing group start and end offset outputs to forward an indication about the start and end offsets of the at least one capturing group in the input data stream.

10. A regular expression matching system, comprising:

at least one non-deterministic finite state machine module, comprising:

a computational unit implementing a non-deterministic finite state machine representing a regular expression, wherein the computational unit is configured to:

receive an input data stream, wherein an occurrence of the regular expression is determined, and an activation signal;

process the input data stream with respect to the non-deterministic finite state machine depending on the activation signal; and provide at least one branch data output for initializing an additional non-deterministic finite state machine module if the processing of an element of the input data stream according to the non-deterministic finite state machine results in a branching of a processing thread;

at least one deterministic finite state machine module comprising a computational unit implementing a deterministic finite state machine representing a regular expression, wherein the computational unit is configured to:

receive the input data stream and an activation signal;

process the input data stream with respect to the implemented deterministic finite state machine depending on the activation signal; and a routing network for use with the at least one non-deterministic finite state machine module, comprising:

an arbitration logic;

a plurality of input ports, each associated with one of the at least one non-deterministic finite state machine module, wherein the plurality of input ports are configured to receive a branch data output from the associated one of the at least one non-deterministic finite state machine module, respectively;

a plurality of output ports, each associated with one of the at least one non-deterministic finite state machine module, wherein the plurality of output ports are configured to activate the associated one of the at least one non-deterministic finite state machine module and forward the branch data output thereto depending on a branch flag information;

wherein the routing network is configured to select, for each received branch data output indicating that an inactive non-deterministic finite state machine module is activated, one of the at least one non-deterministic finite state machine module which is inactive; and to forward the respective branch data output to the respective output port associated with the selected one of the at least one non-deterministic finite state machine modules;

wherein each of the at least one non-deterministic and at least one deterministic finite state machine modules is connected to one of the plurality of input ports and one of the plurality of output ports of the routing network;

wherein the non-deterministic finite state machine module allows for a scalable regular expression matching system to be computed in parallel; and wherein the branch data output includes a branch configuration output to provide a branch configuration information including at least one branch offset information to forward an indication about a start offset of the input data stream or at least one capturing group start and end offset outputs to forward an indication about the start and end offsets of the at least one capturing group in the input data stream.

11. The regular expression matching system according to claim 9, including a number N of non-deterministic finite state machine modules or deterministic finite state machine modules, wherein the number N is defined by:

converting a non-deterministic state machine into a deterministic state machine using a power-set algorithm, storing the mapping between the states of the nondeterministic state machine and the states of the deterministic state machine when the powerset algorithm is applied, and determining the number N by finding the state with the maximum number of nondeterministic states mapped in the deterministic state machine.

12. A regular expression matching method having a plurality of non-deterministic finite state machines, each representing the regular expression and an interconnection network, the method comprising the steps of:

receiving an input data stream, wherein an occurrence of the regular expression is determined;

processing the input data stream with respect to at least one activated non-deterministic finite state machine in a respective processing thread;

providing branch data for initializing an additional processing thread of a non-deterministic finite state machine if the processing of an element of the input data stream according to the at least one activated non-deterministic finite state machine results in a branching of the processing thread;

indicating for each received branch data output that a new processing thread of a non-deterministic finite state machine is initialized, selecting one of the plurality of non-deterministic finite state machines that is inactive; and forwarding the respective branch data output to the selected non-deterministic finite state machine;

wherein the branch data output includes start offset information indicating the element of the input data stream which initiated the respective processing thread;

wherein the non-deterministic finite state machine module allows for a scalable regular expression matching system to be computed in parallel; and wherein the branch data output includes a branch configuration output to provide a branch configuration information including at least one branch offset information to forward an indication about a start offset of the input data stream or at least one capturing group start and end offset outputs to forward an indication about the start and end offsets of the at least one capturing group in the input data stream.

13. A regular expression matching method performed having one non-deterministic finite state machine and a plurality of deterministic finite state machines, each at least partly representing the regular expression, and a routing network, wherein only a first state of the non-deterministic finite state machine is a non-deterministic state while additional states of the non-deterministic finite state machine are deterministic, the method comprising the steps of:

receiving an input data stream in which an occurrence of the regular expression is determined;

processing the input data stream with respect to the one non-deterministic finite state machine;

providing branch data by the non-deterministic finite state machine for initializing an additional processing thread in one of the plurality of deterministic finite state machines;

indicating for each received branch data output that a new processing thread of a deterministic finite state machine is initialized, selecting one of the plurality of deterministic finite state machines that is inactive; and forwarding the respective branch data output to the selected deterministic finite state machine;

wherein the branch data output includes start offset information indicating the element of the input data stream which initiated the respective processing thread;

wherein the non-deterministic finite state machine module allows for a scalable regular expression matching system to be computed in parallel; and wherein the branch data output includes a branch configuration output to provide a branch configuration information including at least one branch offset information to forward an indication about a start offset of the input data stream or at least one capturing group start and end offset outputs to forward an indication about the start and end offsets of the at least one capturing group in the input data stream.

14. A computer program product for regular expression matching having a plurality of non-deterministic finite state machines, each representing the regular expression and an interconnection network, the computer program product comprising a computer useable non-transitory storage medium having program code embodied therewith, the program code readable/executable by a processor to perform the method according to claim 12.

15. A computer program product for regular expression matching having one non-deterministic finite state machine and a plurality of deterministic finite state machines, each at least partly representing the regular expression, and a routing network, wherein only a first state of the non-deterministic finite state machine is a non-deterministic state while additional states of the non-deterministic finite state machine are deterministic, the computer program product comprising a computer useable non-transitory storage medium having program code embodied therewith, the program code readable/executable by a processor to perform the method according to claim 13.

* * * * *